United States Patent
Shpiner et al.

(10) Patent No.: US 10,594,617 B2
(45) Date of Patent: Mar. 17, 2020

(54) PROBABILISTIC NORMALIZED CONGESTION INDICATION BASED ON PACKET SIZE

(71) Applicant: Mellanox Technologies, Ltd., Yokneam (IL)

(72) Inventors: Alex Shpiner, Nesher (IL); Sagi Kuks, Ramat Gan (IL); Liron Mula, Ramat Gan (IL); Gil Levy, Hod Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/132,423

(22) Filed: Sep. 16, 2018

(65) Prior Publication Data
US 2019/0089644 A1    Mar. 21, 2019

Related U.S. Application Data

(60) Provisional application No. 62/559,651, filed on Sep. 18, 2017.

(51) Int. Cl.
*H04L 12/805* (2013.01)
*H04L 12/833* (2013.01)
(Continued)

(52) U.S. Cl.
CPC .............. *H04L 47/36* (2013.01); *H04L 47/31* (2013.01); *H04L 47/32* (2013.01); *H04L 47/50* (2013.01); *H04L 49/30* (2013.01); *G06F 17/18* (2013.01)

(58) Field of Classification Search
CPC ......... H04L 47/36; H04L 47/31; H04L 47/50; H04L 49/30; H04L 47/32; G06F 17/18
See application file for complete search history.

(56) References Cited

U.S. PATENT DOCUMENTS 6,556,578 B1    4/2003    Silberschatz et al.
7,149,187 B1    12/2006   Jacobson et al.
(Continued)

FOREIGN PATENT DOCUMENTS

EP    1322074 A1    6/2003

OTHER PUBLICATIONS

Supplement to InfiniBandTM Architecture Specification, vol. 1, release 1.2.1, annex A16: RDMA over Converged Ethernet (RoCE), InfiniBand Trade Association, 19 pages, Apr. 6, 2010.
(Continued)

*Primary Examiner* — Walli Z Butt
(74) *Attorney, Agent, or Firm* — Kligler & Associates Patent Attorneys Ltd

(57) ABSTRACT

A network device includes circuitry and multiple ports. The circuitry is configured to hold a definition of a normalization function that determines, based on (i) a reference probability of applying a congestion indication operation to packets having a predefined reference packet-size and (ii) a packet-size parameter, a normalized probability of applying the congestion indication operation to packets whose size equals the packet-size parameter. The normalization function depends exponentially on a ratio between the packet-size parameter and the reference packet-size. The circuitry id configured to store packets in a queue, and to schedule transmission of at least some of the queued packets via an output port, to calculate the normalized probability for a given packet, by applying the normalization function to an actual reference probability and an actual size of the given packet, and randomly apply a congestion indication operation to the given packet, in accordance with the normalized probability.

16 Claims, 2 Drawing Sheets

(51) Int. Cl.
*H04L 12/863* (2013.01)
*H04L 12/935* (2013.01)
*H04L 12/823* (2013.01)
*G06F 17/18* (2006.01)

(56) References Cited

U.S. PATENT DOCUMENTS

| | | | |
|---|---|---|---|
| 7,272,111 | B2 | 9/2007 | Zukermam |
| 7,453,798 | B2 | 11/2008 | Bradford et al. |
| 7,636,308 | B2 | 12/2009 | Kwon et al. |
| 7,944,829 | B2 | 5/2011 | Narvaez |
| 8,005,106 | B2 | 8/2011 | Pan et al. |
| 9,591,515 | B2 | 3/2017 | Racz et al. |
| 9,634,916 | B2 | 4/2017 | Briscoe et al. |
| 2004/0100901 | A1 | 5/2004 | Bellows et al. |
| 2011/0205895 | A1* | 8/2011 | Chen ............ H04L 47/10 370/231 |
| 2012/0016986 | A1 | 1/2012 | Jacquet |
| 2014/0328175 | A1 | 11/2014 | Pan et al. |
| 2015/0244622 | A1* | 8/2015 | Wu ............ H04L 47/30 370/235 |
| 2016/0241484 | A1* | 8/2016 | De Schepper ...... H04L 47/56 |
| 2018/0139135 | A1* | 5/2018 | Liang ............ H04L 47/11 |

OTHER PUBLICATIONS

Zhu et al., "Congestion Control for Large-Scale RDMA Deployments", Proceedings of the ACM Conference on Special Interest Group on Data Communication (SIGCOMM '15), London, UK, pp. 523-536, Aug. 17-21, 2015.

Alizadeh et al., "Less is More: Trading a little Bandwidth for Ultra-Low Latency in the Data Center", Proceedings of the 9th USENIX conference on Networked Systems Design and Implementation, San Jose, CA, pp. 253-266, Apr. 25-27, 2012.

Floyd et al., "Random Early Detection Gateways for Congestion Avoidance", IEEE/ACM Transactions on Networking, 22 pages, Aug. 1993.

Nichols et al., "A modern AQM is just one piece of the solution to bufferbloat", Communications of the ACM, vol. 55, issue 7, pp. 42-50, Jul. 2012.

Ramakrishnan et al., "The Addition of Explicit Congestion Notification (ECN) to IP", Request for 30 Comments (RFC) 3168, 63 pages, Sep. 2001.

De Cnodder et al., "Effect of different packet sizes on RED performance", Traffic and Routing Technologies project Alcatel Corporate Research Center, Antwerp, Belgium, 9 pages, Jan. 2018.

Nichols et al., "A modem AQM is just one piece of the solution to bufferbloat", ACM queue—Controlling Queue Delay, 15 pages, year 2012.

Floyd et al., "Random Early Detection Gateways for Congestion Avoidance", Presentation, IEEE/ACM Transactions on Networking, 18 pages, Aug. 1993.

Prakash et al., "The TCP Outcast Problem: Exposing Unfairness in Data Center Networks", Proceedings of the 9th USENIX conference on Networked Systems Design and Implementation, San Jose, CA, pp. 413-426, Apr. 25-27, 2012.

* cited by examiner

PROBABILISTIC NORMALIZED CONGESTION INDICATION BASED ON PACKET SIZE

CROSS-REFERENCE TO RELATED APPLICATIONS

This application claims the benefit of U.S. Provisional Patent Application 62/559,651, filed Sep. 18, 2017, whose disclosure is incorporated herein by reference.

TECHNICAL FIELD

Embodiments described herein relate generally to communication networks, and particularly to methods and systems for randomizing congestion indication based on packet size.

BACKGROUND

Congestion may occur in a communication network when a network element such as a switch or a router is required to deliver traffic to the communication network beyond the link capabilities. Some congestion mitigation methods are based on notifying a traffic source to reduce its transmission rate when or even before congestion occurs.

Methods for congestion mitigation are known in the art. For example, U.S. Pat. No. 6,556,578 describes a method for managing a buffer pool containing a plurality of queues based on consideration of both (a) when to drop a packet and (b) from which queue the packet should be dropped. According to the method a packet drop is signaled with the global average queue occupancy exceeds a maximum threshold and is signaled on a probabilistic basis when the global occupancy is between a minimum threshold and the maximum threshold. Each queue has a particular local threshold value associated with it and is considered to be "offending" when its buffer occupancy exceeds its local threshold. When a packet drop is signaled, one of the offending queues is selected using a hierarchical, unweighted round robin selection scheme which ensures that offending queues are selected in a fair manner. A packet is then dropped from the selected offending queue.

U.S. Patent Application Publication 2014/0328175 describes a method that includes estimating a current queuing latency, the estimated current queuing latency being associated with a queue of packets maintained in a buffer. The method also includes calculating a current drop or mark probability, the current drop or mark probability being associated with a probability that packets associated with the queue of packets will be dropped or marked. A rate at which the packets associated with the queue of packets are de-queued from the buffer is estimated in order to estimate the current queuing latency. The current drop or mark probability is calculated using the current estimated queuing latency.

SUMMARY

An embodiment that is described herein provides a network device that includes circuitry and multiple ports. The multiple ports are configured to connect to a communication network. The circuitry is configured to hold a definition of a normalization function that determines, based on (i) a reference probability of applying a congestion indication operation to packets having a predefined reference packet-size and (ii) a packet-size parameter, a normalized probability of applying the congestion indication operation to packets whose size equals the packet-size parameter, the normalization function depends exponentially on a ratio between the packet-size parameter and the reference packet-size, to store packets received from the communication network via an input port in a queue of the network device, including a given packet, and schedule transmission of at least some of the packets in the queue via an output port, to calculate the normalized probability for the given packet, by applying the normalization function to an actual reference probability and an actual size of the given packet, and to randomly apply a congestion indication operation to the given packet, in accordance with the normalized probability.

In some embodiments, the circuitry is configured to determine the actual reference probability by monitoring the packets in the queue. In other embodiments, the given packet includes a congestion notification field, and the circuitry is configured to apply the congestion indication operation by marking the congestion notification field in the given packet. In yet other embodiments, the circuitry is configured to apply the congestion indication operation by discarding the given packet.

In an embodiment, the circuitry is configured to assign different reference probabilities to queued packets that belong to different respective traffic classes. In another embodiment, the normalization function has a form $Pn=F(Pr, PacketSize)=1-(1-Pr)^{PacketSize/MTU}$, Pn denotes the normalized probability, Pr denotes the reference probability, PacketSize denotes the size of the given packet, and MTU denotes the reference packet-size including a maximal packet-size. In yet another embodiment, the circuitry is configured to hold the normalization function as a predefined table that stores normalized probability values in association with respective pairs of reference probability and packet-size values, and to retrieve a normalized probability value from the table.

In some embodiments, multiple entries of the table correspond to multiple respective values in a selected range of the reference probability, the multiple values are distributed non-linearly over the selected range.

There is additionally provided, in accordance with an embodiment that is described herein, a method, including, in a network device that connects to a communication network using multiple ports, holding a definition of a normalization function that determines, based on (i) a reference probability of applying a congestion indication operation to packets having a predefined reference packet-size and (ii) a packet-size parameter, a normalized probability of applying the congestion indication operation to packets whose size equals the packet-size parameter, the normalization function depends exponentially on a ratio between the packet-size parameter and the reference packet-size. Packets received from the communication network via an input port are stored in a queue of the network device, including a given packet, and transmission of at least some of the packets in the queue is scheduled via an output port. The normalized probability is calculated for the given packet, by applying the normalization function to an actual reference probability and an actual size of the given packet. A congestion indication operation is randomly applied to the given packet, in accordance with the normalized probability.

These and other embodiments will be more fully understood from the following detailed description of the embodiments thereof, taken together with the drawings in which:

DETAILED DESCRIPTION OF EMBODIMENTS

Overview

Figure 1:
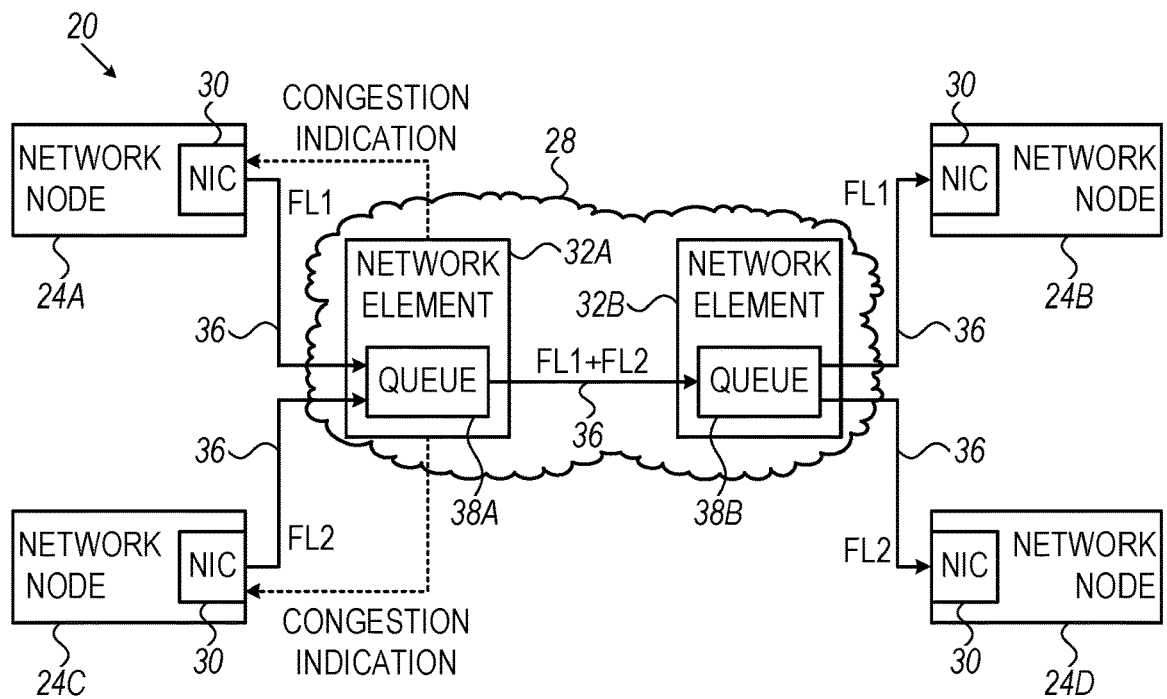
FIG. 1 is a block diagram that schematically illustrates a computation system in which congestion avoidance methods are applied, in accordance with an embodiment that is described herein.

Methods for congestion mitigation may involve detecting congestion in a network element such as a switch or a router, and in response, indicating to relevant traffic sources to reduce their transmission rate, in order to relief the congestion. Signaling or indicating the congestion to relevant traffic sources may be carried out by marking or dropping packets, as will be described below. In the description that follows, the probability of applying a congestion indication operation, such as marking or dropping a packet, is also referred to as a "mark/drop" probability.

Consider one or more source nodes communicating data flows with one or more destination nodes over a communication network. In the packet marking approach, upon detecting existing or imminent congestion, a network element marks one or more packets to be transmitted to target destination nodes, with an explicit congestion indication, e.g., in a predefined field of the packets. The destination nodes receive the marked packets, and in response send notification packets back to the respective source nodes. Alternatively, e.g., when the transport layer protocol comprises the Transmission Control Protocol (TCP), the destination nodes mark Acknowledgment (ACK) packets with a congestion indication and send the marked ACK packets to the respective source nodes. Further alternatively, the network element can send marked packets back to the relevant source node and not via the destination node. In response to receiving the marked packets, the traffic source reduces the rate of injecting packets into the communication network.

Protocols that implement the packet marking approach comprise, for example, the Explicit Congestion Notification (ECN) protocol, the RDMA over Converged Ethernet (RoCE) protocol, and the Data Center Quantized Congestion Notification (DCQCN) protocol.

The ECN method is an extension to the Internet Protocol (IP) and to the TCP, which allows end-to-end congestion notification without dropping packets. The ECN method is described, for example, in a Request for Comments (RFC) 3168, September 2001. The RoCE protocol is specified, for example, in "Supplement to InfiniBand™ Architecture Specification, volume 1, release 1.2.1, annex A16: RDMA over Converged Ethernet (RoCE)," InfiniBand Trade Association, Apr. 6, 2010. The DCQCN protocol is described, for example, in "SIGCOMM '15, Proceedings of the 2015 ACM Conference on Special Interest Group on Data Communication," London, United Kingdom, Aug. 17-21, 2015, pages 523-536.

In the packet dropping approach, upon detecting existing or imminent congestion, the network element discards one or more packets that are addressed to the destination node. In this approach, indicating the congestion to the source node may be done explicitly, e.g., by the destination node sending to the source node one or more Negative-ACK (NACK) packets. Alternatively, the destination node sends to the source node duplicate ACK packets having the same sequence number to signal packet loss events. Similarly to the packet marking approach, a source node that identifies congestion indication caused by packet dropping, reduces its transmission rate in order to relief the congestion.

Unfairness in sharing bandwidth among TCP flows in data center networks is discussed, for example, in "NSDI '12, Proceedings of the 9$^{th}$ USENIX conference on Networked Systems Design and Implementation," San Jose, Calif., Apr. 25-27, 2012.

Embodiments that are described herein provide improved methods and systems for probabilistic congestion indication that result in fair and accurate bandwidth sharing regardless of packet-size.

In principle, probabilistic congestion indication can be applied, e.g., using the Random Early Detection (RED) method. In RED, during congestion, packets are randomly selected for dropping or marking, with a probability that depends on the congestion level. RED is a congestion avoidance method, which is described, for example, by Floyd et al. in "Random Early Detection Gateways for Congestion Avoidance," IEEE/ACM Transactions on Networking, August 1993. In RED, the average queue length is estimated and compared to configurable low and high thresholds. When the average queue length falls between the low and the high thresholds, the router starts to drop or mark packets with a probability that increases linearly with the excess average queue length over the low threshold. When the average queue length exceeds the high threshold, the router discards all of the queued packets. Weighted RED (WRED) is an extension to RED, in which different configurations of the low and high thresholds are used for packets of different respective traffic classes, in a single queue. In an example embodiment, an egress port comprises 16 queues, and each queue supports three pairs of low and high thresholds for WRED. Alternatively, other suitable numbers of queues per egress port and other suitable numbers of low/high threshold pairs can also be used.

In the above cited paper by Floyd et al., the queue length is typically defined as the number of packets queued. Conventional methods for congestion indication such as RED variants, however, do not fairly share bandwidth among data flows having different packet sizes. In another possible approach that takes packet-size into consideration, packets whose size is larger than a predefined size can be dropped or marked. This approach gives high priority to control-packets that are typically smaller than data packets.

In some embodiments of the present invention, a processor of the network element determines a probability of applying a congestion indication operation to packets, in two phases. In the first phase, the processor monitors the queued packets for detecting imminent congestion using any suitable method, such as, for example, based on queue length. In the first phase, the processor also determines a reference probability Pr of applying the congestion indication operation to packets having a predefined reference size. The reference size comprises, for example, the Maximum Transmission Unit (MTU) used. In the second phase, the processor calculates for a packet having a given size, a normalized probability Pn of applying to the packet the congestion indication operation. The processor applies the congestion indication operation (e.g., marking or dropping) to the packet in accordance with the normalized probability.

In some embodiments, the processor calculates the normalized probability using a normalization function given by $Pn=F(Pr,x)=1-(1-Pr)^{1/x}$, wherein x is the ratio between the reference size and the size of the given packet. This normalization function is fair in the sense that it results in the same probability of marking or dropping one or more packets during some time interval, regardless of the packets' sizes. As such, given two data flows of packets having a common packet-size, and assuming the same reference probability Pr, the processor discards approximately the same number of packets from each of the data flows, during some time interval. Using the normalization function above provides fairness among data flows in a sense that at least one packet is discarded in a given interval, regardless of the packet size.

As a specific example, the probability of marking or dropping a single packet of size MTU, equals the probability of applying a congestion indication operation to at least one packet in a sequence of W packets having a size MTU/W.

In some embodiments, the normalization function is implemented in hardware using a lookup table. Each entry in the table holds a value of Pn that is associated with a pair (Pr,x). The lookup table is defined over a discrete set of Pr and x values. To achieve high-precision in calculating the normalized probability, the discrete set may be defined with high resolution, which increases the storage space required for the lookup table.

In the disclosed techniques, a normalized probability of applying a congestion indication operation is calculated in two independent phases. During congestion, a reference probability is first determined for a reference packet-size, using any suitable method. In the second phase, a normalization function is applied to the reference probability for calculating the normalized probability. The normalization function is independent of the specific method employed in the first phase, and results in fair bandwidth sharing of a congested link among data flows having different packet sizes. The normalization function can be implemented efficiently, for example, using a lookup table.

In describing the disclosed embodiments we refer mainly to network elements such as a switch or a router. The disclosed embodiments are similarly applicable, however, to any other device in the network that queues packets, such as a network adapter or Network Interface Controller (NIC). In the present context and in the claims, the term "network device" refers to any device in the network that queues packets and may be required to drop or mark packets in response to becoming congested.

The disclosed techniques are expected to improve the fairness of bandwidth sharing among data flows having different respective packet sizes, for example, when using the Remote Direct Memory Access (RDMA) protocol, or using the TCP protocol with data flows having different respective MTUs.

System Description

FIG. 1 is a block diagram that schematically illustrates a computation system 20 in which network congestion avoidance methods are applied, in accordance with an embodiment that is described herein.

Computation system 20 comprises network nodes 24 that communicate with one another over a packet network 28. Network node 24 connects to the packet network using a suitable Network Interface Controller (NIC) 30. Packet network 28 may comprise any suitable packet network, operating using any suitable protocols. For example, packet network 28 may comprise an Internet Packet (IP) network employing the Transmission Control Protocol (TCP) for the transport layer, such as the Internet. Alternatively, packet network 28 comprises an Ethernet network or an Infiniband™ network.

Computation system 20 may comprises, for example, a data center or a cloud computing system, in which at least some of the network nodes comprise computer and or storage systems or devices.

Packet network 28 comprises network elements 32 that interconnect with one another and with other elements such as network nodes 24 using links 36. Each link 36 supports a predefined maximal link rate for data transmission. The network elements may comprise, for example, routers, switches, bridges, or any other suitable type of a network element. In FIG. 1, each network element comprises a queue 38 for temporarily storing packets in flight. The network elements may be interconnected in any suitable topology such as, for example, a "fat tree" topology.

In the example of FIG. 1, network node 24A sends packets of a data flow denoted FL1, over the packet network, to network node 24B. Similarly, network node 24C sends packet of a data flow denoted FL2, over the packet network, to network node 24D. In the present example, packets from both FL1 and FL2 are queued for transmission in the same queue 38A of network element 32A. In the context of the present disclosure, the term "data flow" refers to a sequence of packets that are sent from a source to a destination over the communication network.

In the example of FIG. 1, network element 32A forwards packets of both FL1 and FL2, from queue 38A to network element 32B over a common link 36. When the combined transmission rate of FL1 and FL2 exceeds the maximal link rate, link 36 between network element 32A and 32B become congested. As a result, queue 38A fills with packets that cannot be transmitted to the network at the desired rate.

At least some of the network elements in packet network 28 are configured to apply congestion avoidance methods. In the example of FIG. 1, when queue 38A fills to a certain level, which indicates imminent congestion, network element 32A indicates to network elements 24A and 24B to reduce the rate in which they inject packets into the packet network. As will be described below, in some embodiments, the network element indicates congestion to the sender explicitly, by marking a congestion indication in a header of a packet destined to the sender. In another embodiment, the network element discards one or more packets to indicate the congestion to the sender via underlying transport-layer protocols.

Figure 2:
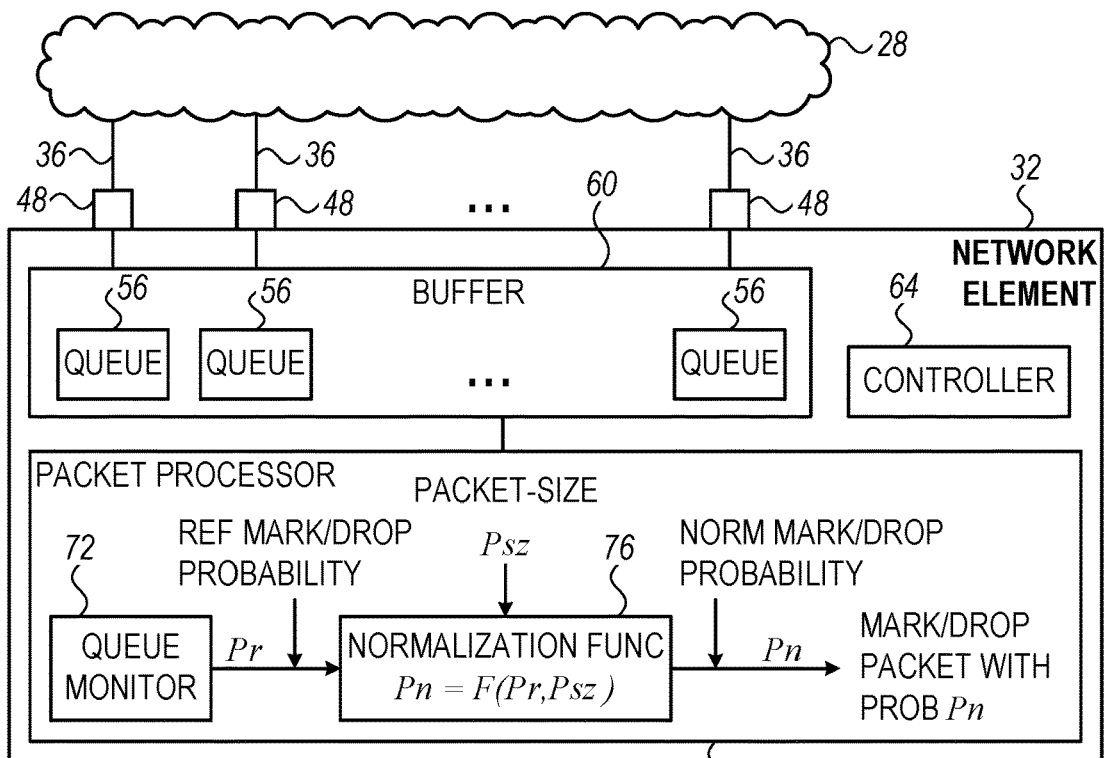
FIG. 2 is a block diagram that schematically illustrates a network element that supports fair probabilistic congestion indication, in accordance with an embodiment that is described herein.

FIG. 2 is a block diagram that schematically illustrates network element 32 that supports fair probabilistic congestion indication, in accordance with an embodiment that is described herein.

Network element 32 comprises multiple ports 48 for connecting to packet network 28. Each port comprises a suitable mechanical connector (not shown) for coupling to link 36, and electrical circuit (not shown) for transmitting and/or receiving packets to and from the packet network via link 36. In a typical implementation, port 48 functions both as an input port for receiving packets from the packet network, and as an output port for transmitting packets to the packet network.

Network element 32 comprises a packet processor 52 for processing incoming and outgoing packets. In the ingress direction, the packet processor applies to packets received in the network element via ports 48, various processing such as verifying the correctness of the data in the packet payload, packet classification and prioritization, and routing. The packet processor typically checks certain fields in the packets headers for the purpose of packet classification and routing. The header fields contain addressing information, such as source and destination addresses and port numbers, and the underlying network protocol used.

The packet processor stores processed packets that are awaiting transmission in one or more queues 56 in a buffer 60. In some embodiments, buffer 60 comprises a shared buffer that dynamically manages queuing resources within the network element. Buffer 60 may comprise, for example, a Random Access Memory (RAM), or any other type of memory using any suitable storage technology.

In the egress direction, packet processor 52 schedules the transmission of packets stored in queues 56 via respective output ports using any suitable arbitration scheme, such as, for example, a round-robin scheduling scheme. Packet processor 52 de-queues packets, e.g., in accordance with their order of arrival and/or based on packet priority such as Quality of Service (Qos).

For the purpose of congestion mitigation, packet processor 52 comprises a queue monitor 72 and a normalization function 76. Queue monitor 72 monitor one or more attributes of queue 56 to detect imminent congestion. For example, the queue monitor checks the instantaneous or average occupancy level of the queue. Additionally or alternatively, the queue monitor estimates the queuing delay of queue 56 using any suitable method as known in the art.

Network element 32 comprises a controller 64, which performs various management and packet-processing functions for the network element. For example, controller 64 configures packet processor 52 to apply the desired routing plan. In some embodiments, controller 64 configures elements in packet processor 52 such as, parameters used by the queue monitor, normalization function 76 and the congestion indication operation to be applied to selected packets.

In some embodiments, the queue monitor determines, based on one or more monitored queue attributes, a reference probability Pr of applying a congestion indication operation to packets having a predefined reference packet-size. In an embodiment, the reference packet-size is the Maximum Transmission Unit (MTU), i.e., the maximal packet-size in accordance with the underlying communication protocols.

The congestion indication operation may be any suitable operation applied to the packet that results in indicating to the packet sender of the imminent congestion. In some embodiments, the congestion indication operation comprises a marking operation that marks a congestion indication field in a header field of the packet. In other embodiments, the congestion operation comprises a packet drop operation, i.e., discarding the packet from the queue without sending the packet to its destination.

For a given packet, normalization function 76 accepts the reference probability Pr from the queue monitor, and the actual packet size PSZ, and calculates for the given packet, a normalized probability Pn of applying the congestion indication operation to the given packet as given generally by:

$$Pn = F(Pr, Psz) \qquad \text{Equation 1:}$$

The packet processor randomly applies the congestion indication operation to the given packet, with the normalized probability Pn. Example normalization functions will be described further below.

The configurations of packet network 28 and network element 32 shown in FIGS. 1 and 2 are example configurations, which are chosen purely for the sake of conceptual clarity. In alternative embodiments, any other suitable packet network, and network element configurations can be used.

Some elements of network element 32 such as packet processor 52, including queue monitor 72 and normalization function 76, may be implemented in hardware, e.g., in one or more Application-Specific Integrated Circuits (ASICs) or Field-Programmable Gate Arrays (FPGAs). Additionally or alternatively, some elements of network element 32, for example packet processor 52, including queue monitor 72, normalization function 76 or both, can be implemented using software, or using a combination of hardware and software elements. Buffer 60 in which queues 56 are implemented may be implemented using any suitable memory, such as Random Access Memory (RAM).

In the context of the present patent application and in the claims, the term "circuitry" refers to all of the elements of network element 32 excluding ports 48. In FIG. 1, the circuitry comprises buffer 60, packet processor 52 including queue monitor 72 and normalization function 76, and controller 64.

In some embodiments, some of the functions of the circuitry, e.g., functions of packet processor 52 and controller 64 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Randomizing Congestion Indication

Methods for producing explicit or implicit congestion indication to the sender, typically rely on detecting congestion (or imminent congestion) based on queuing attributes such the number of packets queued.

Consider, for example, a data flow FL1 comprising packets having the MTU size, and another data flow FL2 comprising packets having a size of MTU/4. Both data flows are persistent and deliver the same data rate BR, e.g., measured in bits/second. Data flow FL1 delivers BR/MTU packets per second, whereas FL2 delivers 4·BR/MTU packets per second. In addition, the packets of FL1 and FL2 are destined to be queued for transmission in a common queue. In an alternative example, FL1 and FL2 are queued in different respective queues Q1 and Q2, assuming an arbitration scheme between the two queues that is 60/40 in favor of Q1 over Q2. In this example, Q1 and Q2 may have different respective marking or dropping probabilities for the same queue length.

Based on the current queue length, a probability of marking or dropping a single packet is P1=0.5. In using a first method that is based on the number of packets queued (queue length), during a time interval T=MTU/BR seconds, one packet of FL1 and four packets of FL2 are transmitted. The probabilities of indicating congestion to the sources of FL1 and FL2 are therefore P1=0.5, and P2=[1−(1−P1)$^4$]= 0.93, respectively, for the same congestion level. Since P2>P1, the number of packets marked or dropped from FL2 is larger than from FL1, the source of FL2 reduces its data rate more than the source of FL1. By using the first method, the data flow having larger packets (FL1) gets a significantly larger share of the bandwidth of the congested link to which the packets of FL1 and FL2 are forwarded.

A second method, which is based on the RED variant that takes into consideration the packet-size, the probabilities of indicating congestion to the respective sources of FL1 and FL2, during the T=MTU/BR interval, are P1=0.5 and P2= [1−(P1/4)$^4$]=0.41. In this case P1>P2, and FL2 gets a larger share of the bandwidth compared to FL1. Note that in using the second method, P1 and P2 are much closer to one another compared to the first method above.

Both the first and second methods are therefore unfair to data flows having different packet-sizes.

In some embodiments, the packet processor determines the probability of congestion notification in two independent phases. In the first phase, the packet processor monitors the queued packets to determine a reference probability Pr. In the second phase, the packet processor calculates, based on the reference probability and the actual packet-size, a normalized probability Pn. By using the two-phase method, the packet processor randomly indicates congestion with the same normalized probabilities for data flows having different respective packet sizes, for a given time interval and the same congestion level.

In the disclosed embodiments, the packet processor may calculate the reference probability Pr using any suitable method, such as based on queue-length, queuing delay, derivative of the queue length or based on a combination of such methods. The derivative of the queue length is typically indicative of the evolving trend of the queue length. For example, when the queue length has a high valued derivative, the queue length is expected to increase or decrease fast.

In some embodiments, the packet processor calculates Pr using one of the methods: RED, Proportional Integral Controller Enhanced (PIE) and Controlled Delay CoDel. The PIE method uses both the derivative of the queue length and the derivative of the queue latency, and is specified, for example, in a Request for Comments (RFC) 8033, February 2017. PIE is designed for controlling queuing latency, which makes it suitable for latency-sensitive applications. CoDel is described, for example, in "Controlling Queue Delay," Communications of the ACM, CACM Homepage archive, volume 55, issue 7, July 2012, Pages 42-50.

In some embodiments, the packet processor calculates the normalized probability Pn, in the second phase, using the following normalization function:

$$Pn = F(Pr, \text{PacketSize}) = F(Pr, \text{MTU}/x) = 1 - (1 - Pr)^{1/x} \quad \text{Equation 2:}$$

In Equation 2, the packet size is given by the ratio MTU/x, wherein $x \geq 1$. For $x=1$, the packet-size equals MTU, and Pn=Pr. For $x>1$, Pn is a decreasing function of $1/x$ for a given Pr. For the extreme values Pr=0 and Pr=1, the respective normalized probabilities are given by Pn=0 and Pn=1.

The normalization function in Equation 2 depends exponentially on the ratio between the packet-size parameter and the reference packet-size (e.g., MTU). Note that the normalization function in Equation 2 is given by way of example, and any other suitable normalization function that depends exponentially on the ratio between the packet-size parameter and the reference packet-size can also be used.

In accordance with Equation 2, the probability of congestion indication of a single packet of size MTU equals the probability of congestion indication of one or more packets in a sequence of W packets of size MTU/W.

Figure 3:
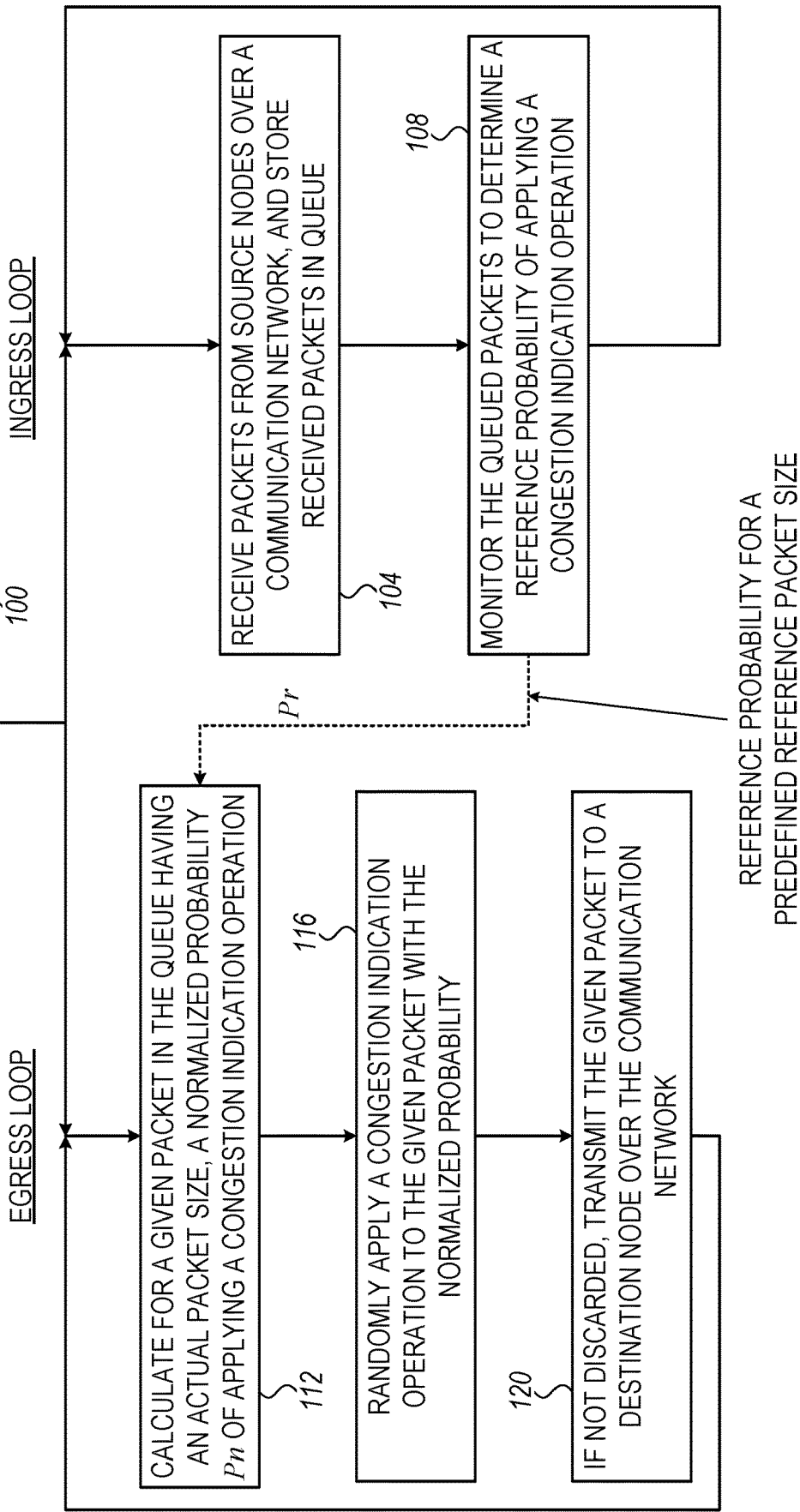
FIG. 3 is a flow chart that schematically illustrates a method for indicating congestion to a sender, with normalized probability, in accordance with an embodiment that is described herein.

FIG. 3 is a flow chart that schematically illustrates a method for indicating congestion to a sender, with normalized probability, in accordance with an embodiment that is described herein. The method will be described as being executed, by packet processor 52 and other elements of network element 32.

The method begins at a function definition step 100, with the packet processor holding a definition of a normalization function F(•) that calculates a normalized probability of applying a congestion indication operation to packets depending on the packet size. In an embodiment, the packet processor is configured to hold the normalization function given in Equation 2 above.

In the example of FIG. 3, the method proceeds with performing ingress and egress processing loops in parallel. In the ingress loop part of the method begins, at a reception step 104, with the packet processor receiving packets from packet network 28 via ports 48, and storing the received packets in one or more queues 56. The received packets typically belong to multiple different data flows that may originate from one or more source nodes.

The packet processor may apply various methods in queuing the packets. In some embodiments, the packet processor stores all the packets destined to a given egress port in a common queue. In other embodiments, the packet processor stores the packets destined to a given port in multiple queues, e.g., based on service class attribute associated with the received packets.

At a monitoring step 108, queue monitor 72 of the packet processor monitors the queued packets, in order to detect imminent congestion. For example, the queue monitor evaluates certain queuing attributes such as the occupancy levels in one or more of queues 56. Based on the monitored queuing attributes, the queue monitor determines a reference probability Pr of applying a congestion indication operation to packets having a reference packet-size. Following step 108 the method part implementing the ingress loop part of the method loops back to step 104 to receive subsequent packets.

The egress loop part of the method begins with the packet processor calculating for a given queued packet, a normalized probability Pn of applying to the given packet a congestion indication operation, at a normalized probability calculation step 112. The packet processor calculates Pn using the normalization function of step 100.

At a random indication step 116, the packet processor applies the congestion indication to the packet with probability Pn. In an example embodiment, the normalized probability Pn is given as a non-negative number in the range [0-1]. In an embodiment, the packet processor generates a random (or a pseudo-random) number $0 \leq R \leq 1$, and applies the congestion indication operation only when R<Pn.

When the congestion indication operation comprises a packet marking operation, the packet should be transmitted to the destination independently of whether the packet was marked or not. When the congestion indication operation comprises a packet dropping operation, the packet should be transmitted to the destination only when the packet has not been dropped.

At a transmission step 120, the packet processor schedules transmission of the packet (if the packet was not dropped) to the packet destination via a selected port 48. In some embodiments, the packet processor de-queues packets from a queue 56 using a First-In First-Out (FIFO) method, i.e., packets are de-queued for transmission in accordance with their order of arrival. In alternative embodiments, other suitable transmission scheduling and arbitration techniques can be used.

Following step 120 the egress loop part of the method loops back to step 112, to calculate a normalized probability of applying congestion indication, for a subsequent queued packet.

In some embodiments, a queue stores packets that belong to different traffic classes or service levels. In such embodiments, the queue monitor assigns different reference probabilities to queued packets that belong to different respective traffic classes. To this end, the queue monitor employs, for example, the WRED method mentioned above. Managing WRED is similar to arbitrating among queues with different arbitration probabilities, as noted above.

Efficient Implementation of Normalization Function

In some embodiments, e.g., when the network element operates at very high data or packet rates, the normalization function is implemented in hardware, for example, using discrete components or using a lookup table.

In an embodiment, a lookup table holds approximate values of the normalized probability Pn for a finite set of discrete values of the reference probability Pr and packet-size Psz. The lookup table may be implemented using any suitable type of memory and storage technology, such as, for example, a Read Only Memory (ROM) or a Nonvolatile Memory (NVM). Moreover, the lookup table can be implemented using any suitable data structure such as, for example, a Two-Dimensional (2D) table.

In applying the table-based normalization function, the packet processor quantizes the values of the input parameters, i.e., the reference probability Pr and the actual packet size Psz, to respective quantized values P'r and P'sz for which the lookup table holds a normalized probability value. For example, quantizing a parameter comprises applying to the parameter a suitable rounding operation. The packet processor reads from the lookup table the normalized probability P'n associated with the quantized parameters P'r and P'sz. The packet processor applies a congestion indication operation with probability P'n.

In one embodiment, the lookup table holds for each pair of discrete parameters (P'r,P'sz), a respective value P'n of the normalized probability, which approximates F(P'r,P'sz). The desired normalization function F is thus approximated by (i) sampling the ranges of the function input parameters and (ii) representing the values of the normalized probability using a predefined number of bits.

For N values of P'r and M values of P'sz, the lookup table stores (N·M) values of the normalized probability. Assuming B bits per table entry, such a lookup table requires a storage space of (N·M·B) bits.

The lookup table implementation imposes a tradeoff between complexity and accuracy. High-resolution sampling the function parameters and high-precision representation of the normalization probability results in an accurate approximation, but requires large storage space, and vice-versa.

Consider, for example, a lookup table designed for packet sizes between 64 Bytes and 2 KBytes (MTU) and a normalized probability range [0-0.7]. Table 1 below summarizes the maximal and average error values between the normalized probability values of the theoretical function given in Equation 2, and its table-based implementation. In Table 1, each of the parameters Pr and Psz is quantized uniformly into 10 and 100 discrete values. In the present example P'n is represented using 16 bits.

TABLE 1

Accuracy error of table-based normalization function

|  | 10 values per parameter | 100 values per parameter |
| --- | --- | --- |
| Maximal error | 0.07 | 0.01 |
| Average error | 0.02 | 0 |

In some embodiments, the lookup table is designed with a non-uniform distribution of the normalization function parameters. For example, instead of a uniformly-distributed range of discrete Pr values [0, 0.1, 0.2, 0.3, 0.4, 0.5] an alternative non-uniformly range such as [0, 0.1, 0.15, 0.2, 0.3, 0.5] can also be used. Similarly, the lookup table can be designed for typical packet-size values that should be supported, rather than uniformly sampling the packet-size range.

In another embodiment, the lookup table is designed for one or more partial sub-ranges of the full parameter ranges. For example, for small values of Pr, e.g., below 0.2, the packet processor calculates the normalized probability using a linear approximation method, or using any other suitable approximation method, which is sufficiently accurate and is relatively simple to calculate in real time. In this example, for a sub-rage of reference probability values above 0.2, the packet processor extracts the normalized probability value from the lookup table, as described above.

The inventors used computer simulations to evaluate the fairness of bandwidth sharing, using the disclosed embodiments, in RDMA communication combined with the end-to-end congestion control scheme of DCQCN. In the simulated environment, four senders send packets of data flows having different respective packet sizes to a single receiver. The packet sizes used in the four data flows are 128 Bytes, 512 Bytes, 1 Kbytes and 4 Kbytes, respectively. The experiment was conducted using the two-phase approach in which the first phase comprises a RED method and the second phase comprises a null phase or the normalization function of Equation 2. The simulations show that by using the normalization function, the senders of the four data flows converge to similar transmission rates, which is unachievable when the second phase of applying the normalization function is bypassed.

The embodiments described above are given by way of example, and other suitable embodiments can also be used. For example, although in the embodiments described above, queued packets are marked or dropped with normalized probability, in alternative embodiments, the packets are similarly marked or dropped, before being stored in the queue.

Although the embodiments described above refer mainly to a switch or a router as the notification point of congestion, the embodiments are similarly applicable to any entity that identifies and notifies congestion. For example, consider a network adapter in a host node (e.g., an Ethernet adapter or a NIC) that internally queues packets coming from the network, and provides the queued packets to a CPU of the host via a suitable bus such as a PCI or PCIe bus. The network adapter may become congested when the bandwidth of the incoming packets exceeds the bandwidth supported by the PCI bus, or exceeds the caching bandwidth of the network adapter. Upon identifying congestion, the network adapter marks or drops packets using the improved embodiments described above, including calculating a normalized mark/drop probability based, on the expression given in Equation 2 above.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   multiple ports, configured to connect to a communication network; and
   circuitry, configured to:
   hold a definition of a normalization function that determines, based on (i) a reference probability of applying a congestion indication operation to packets having a predefined reference packet-size and (ii) a packet-size parameter, a normalized probability of applying the congestion indication operation to packets whose size equals the packet-size parameter, wherein the normalization function depends exponentially on a ratio between the packet-size parameter and the reference packet-size;
   store packets received from the communication network via an input port in a queue of the network device, including a given packet, and schedule transmission of at least some of the packets in the queue via an output port;
   calculate the normalized probability for the given packet, by applying the normalization function to an actual reference probability and an actual size of the given packet; and
   randomly apply a congestion indication operation to the given packet, in accordance with the normalized probability.

2. The network device according to claim 1, wherein the circuitry is configured to determine the actual reference probability by monitoring the packets in the queue.

3. The network device according to claim 1, wherein the given packet comprises a congestion notification field, and wherein the circuitry is configured to apply the congestion indication operation by marking the congestion notification field in the given packet.

4. The network device according to claim 1, wherein the circuitry is configured to apply the congestion indication operation by discarding the given packet.

5. The network device according to claim 1, wherein the circuitry is configured to assign different reference probabilities to queued packets that belong to different respective traffic classes.

6. The network device according to claim 1, wherein the normalization function has a form $Pn=F(Pr,PacketSize)=1-(1-Pr)^{PacketSize/MTU}$, wherein Pn denotes the normalized probability, Pr denotes the reference probability, PacketSize denotes the size of the given packet, and MTU denotes the reference packet-size comprising a maximal packet-size.

7. The network device according to claim 1, wherein the circuitry is configured to hold the normalization function as a predefined table that stores normalized probability values in association with respective pairs of reference probability and packet-size values, and to retrieve a normalized probability value from the table.

8. The network device according to claim 7, wherein multiple entries of the table correspond to multiple respective values in a selected range of the reference probability, wherein the multiple values are distributed non-linearly over the selected range.

9. A method, comprising:
   in a network device that connects to a communication network using multiple ports, holding a definition of a normalization function that determines, based on (i) a reference probability of applying a congestion indication operation to packets having a predefined reference packet-size and (ii) a packet-size parameter, a normalized probability of applying the congestion indication operation to packets whose size equals the packet-size parameter, wherein the normalization function depends exponentially on a ratio between the packet-size parameter and the reference packet-size;
   storing packets received from the communication network via an input port in a queue of the network device, including a given packet, and scheduling transmission of at least some of the packets in the queue via an output port;
   calculating the normalized probability for the given packet, by applying the normalization function to an actual reference probability and an actual size of the given packet; and
   randomly applying a congestion indication operation to the given packet, in accordance with the normalized probability.

10. The method according to claim 9, and comprising determining the actual reference probability by monitoring the packets in the queue.

11. The method according to claim 9, wherein the given packet comprises a congestion notification field, and wherein applying the congestion indication operation comprises marking the congestion notification field in the given packet.

12. The method according to claim 9, wherein applying the congestion indication operation comprises discarding the given packet.

13. The method according to claim 9, wherein the determining the reference probability comprises assigning different reference probabilities to queued packets that belong to different respective traffic classes.

14. The method according to claim 9, wherein the normalization function has a form $Pn=F(Pr,PacketSize)=1-(1-Pr)^{PacketSize/MTU}$, wherein Pn denotes the normalized probability, Pr denotes the reference probability, PacketSize denotes the size of the given packet, and MTU denotes the reference packet-size comprising a maximal packet-size.

15. The method according to claim 9, wherein holding the normalization function comprises holding a predefined table that stores normalized probability values in association with respective pairs of reference probability and packet-size values, and wherein applying the normalization function comprises retrieving a normalized probability value from the table.

16. The method according to claim 15, wherein multiple entries of the table correspond to multiple respective values in a selected range of the reference probability, wherein the multiple values are distributed non-linearly over the selected range.

* * * * *